(12) United States Patent
Heller et al.

(10) Patent No.: US 11,106,643 B1
(45) Date of Patent: Aug. 31, 2021

(54) SYSTEM AND METHOD FOR INTEGRATING SYSTEMS TO IMPLEMENT DATA QUALITY PROCESSING

(71) Applicant: Synchrony Bank, Draper, UT (US)

(72) Inventors: Justin Heller, Stamford, CT (US); Mark Jansma, Higganum, CT (US)

(73) Assignee: SYNCHRONY BANK, Stamford, CT (US)

( * ) Notice: Subject to any disclaimer, the term of this patent is extended or adjusted under 35 U.S.C. 154(b) by 62 days.

(21) Appl. No.: 15/666,685

(22) Filed: Aug. 2, 2017

(51) Int. Cl.
*G06F 16/21* (2019.01)
*G06F 16/215* (2019.01)

(52) U.S. Cl.
CPC .................. *G06F 16/215* (2019.01)

(58) Field of Classification Search
CPC ..................................................... G06F 16/215
USPC ....................................................... 707/694
See application file for complete search history.

(56) References Cited

U.S. PATENT DOCUMENTS

| | | | | |
|---|---|---|---|---|
| 8,781,882 | B1* | 7/2014 | Arboletti | G06Q 10/0639 705/7.39 |
| 10,013,439 | B2* | 7/2018 | Gruenheid | G06F 16/215 |
| 2005/0182739 | A1* | 8/2005 | Dasu | G06Q 10/00 706/47 |
| 2009/0018996 | A1* | 1/2009 | Hunt | G06Q 30/02 |
| 2009/0076841 | A1* | 3/2009 | Baker | G06Q 10/10 705/2 |
| 2011/0173149 | A1* | 7/2011 | Schon | G06F 16/24564 706/48 |
| 2012/0311426 | A1* | 12/2012 | Desai | G06F 17/2705 715/227 |
| 2013/0297567 | A1* | 11/2013 | George | G06F 17/241 707/687 |
| 2014/0075028 | A1* | 3/2014 | Weiner | G06F 16/215 709/226 |
| 2015/0121280 | A1* | 4/2015 | Slatner | G06Q 10/10 715/772 |
| 2015/0261796 | A1* | 9/2015 | Gould | G06F 16/215 707/694 |
| 2016/0011926 | A1* | 1/2016 | Grasselt | G06F 11/0769 714/57 |
| 2016/0070724 | A1* | 3/2016 | Marrelli | G06F 16/24578 707/692 |
| 2016/0070725 | A1* | 3/2016 | Marrelli | G06F 16/84 707/692 |
| 2016/0070733 | A1* | 3/2016 | Gould | G06F 40/174 707/700 |

(Continued)

*Primary Examiner* — Hanh B Thai
(74) *Attorney, Agent, or Firm* — Polsinelli PC

(57) ABSTRACT

System and method for integrating systems to implement data quality processing. A business rule creation module is configured to create a business rule associated with a business term. A data quality specification module is configured to create a data quality specification based on the business rule. The data quality specification comprises (1) an identity of a column of a table stored in a database comprising data to be tested; (2) a test to perform on the data to be tested; and (3) reference data required to perform the test on the data. A validation module is configured to receive the data quality specification; retrieve data associated with the column from the database; and test the retrieved data in accordance with the test using the reference data. A result publication module is configured to return a result of the test to the data quality specification module.

27 Claims, 5 Drawing Sheets

(56) References Cited

U.S. PATENT DOCUMENTS

| | | | |
|---|---|---|---|
| 2016/0098654 A1* | 4/2016 | Bhattacharjee | G06Q 10/0637 |
| | | | 705/7.36 |
| 2017/0235848 A1* | 8/2017 | Van Dusen | G06Q 50/01 |
| | | | 705/12 |
| 2018/0113898 A1* | 4/2018 | Hall | G06F 16/215 |
| 2019/0138627 A1* | 5/2019 | Raman | G06F 8/36 |

* cited by examiner

210

SYSTEM AND METHOD FOR INTEGRATING SYSTEMS TO IMPLEMENT DATA QUALITY PROCESSING

FIELD OF THE INVENTION

The invention relates to integrating systems to implement data quality assessments.

BRIEF SUMMARY OF EXEMPLARY EMBODIMENTS OF THE INVENTION

Embodiments of the present invention are directed to a system and method for integrating systems to implement data quality processing. A business rule creation module is configured to create a business rule associated with a business term. A data quality specification module is configured to create a data quality specification based on the business rule. The data quality specification comprises (1) an identity of a column of a table stored in a database comprising data to be tested; (2) a test to perform on the data to be tested; and (3) reference data required to perform the test on the data. A validation module is configured to receive the data quality specification; retrieve data associated with the column from the database; and test the retrieved data in accordance with the test using the reference data. A result publication module is configured to return a result of the test to the data quality specification module.

In some embodiments, the data quality specification further comprises at least one of (1) an effective date for the test; and (2) a test pass/fail indicator.

In some embodiments, the system further includes a lineage module configured to maintain data describing the test performed on the data.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE EXEMPLARY EMBODIMENTS

Maintaining data quality is a significant issue facing organizations. If a data quality issue is observed or suspected, even in a single record, it is necessary to systematically identify the full universe of exceptions/data quality issues that may exist to quantify the size and scope of the issue and understand the impact on an organization.

The present invention allows for systematic identification of data quality issues that may exist within the processing systems of an organization. More particularly, the invention involves creation of a well-defined data quality specification from metadata stored in a first system in a manner that a second system can readily access, ingest, and implement a data quality rule in accordance with the specification and a defined workflow.

Figure 1:
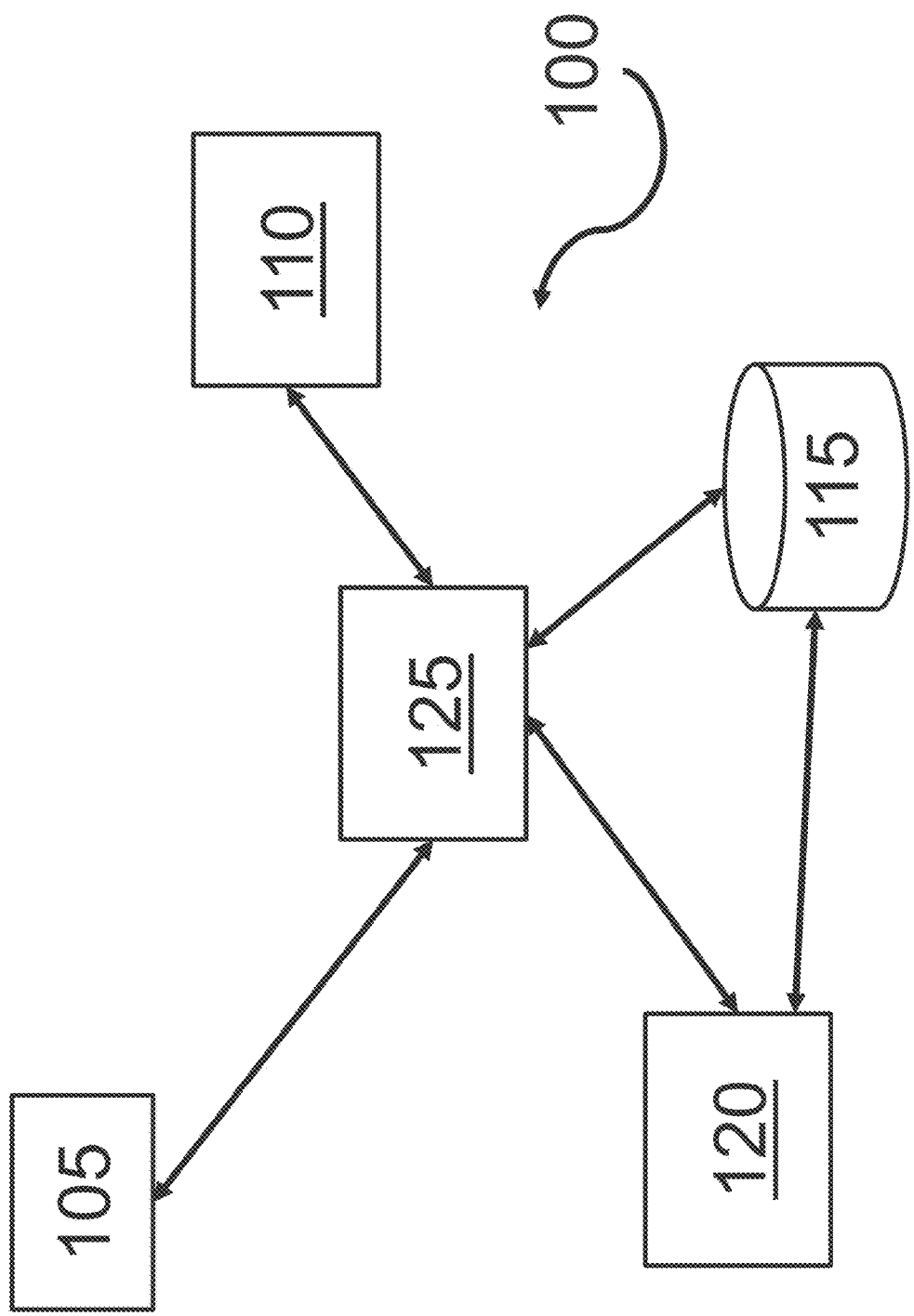
FIG. 1 is a diagram illustrating an exemplary system of the present invention.

With reference to FIG. 1, the overall system 100 is described. First system 110 is one that allows for creation of a data quality rule specification and stores data, metadata and the specifications. The second system 120 is one that receives data quality rule specifications and context data from first system 110 and, using such information, retrieves data from one or more databases 115, as indicated by the rule specification, and tests such data in accordance with the rules indicated in the rule specifications. An end user may access system 100 may be via a user device 105 employing a web browser. All communications among the components of system 100 may be through central server 125.

Business rules and specifications are created in first system 110 and second system 120 retrieves the data to be tested from a particular table in a database 115 as specified in the specification. Second system 120 performs the testing on the data retrieved from the database 115 and sends the results back to first system 110. The results of the testing comprise data describing the number of exceptions to the rule.

Figure 2A:
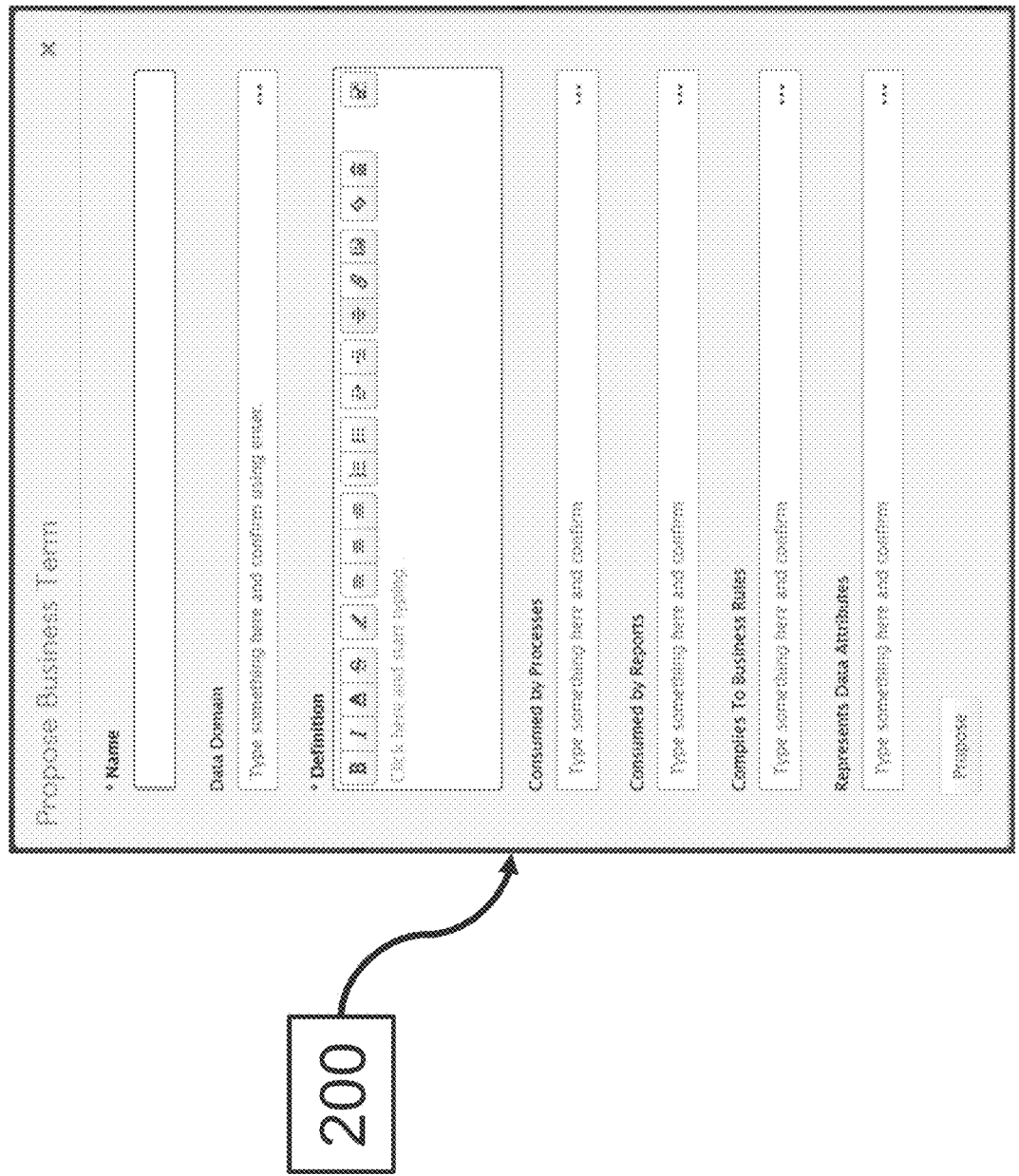
FIGS. 2A and 2B are exemplary user interfaces that may be used in accordance with a preferred embodiment of the present invention.
Figure 2B:
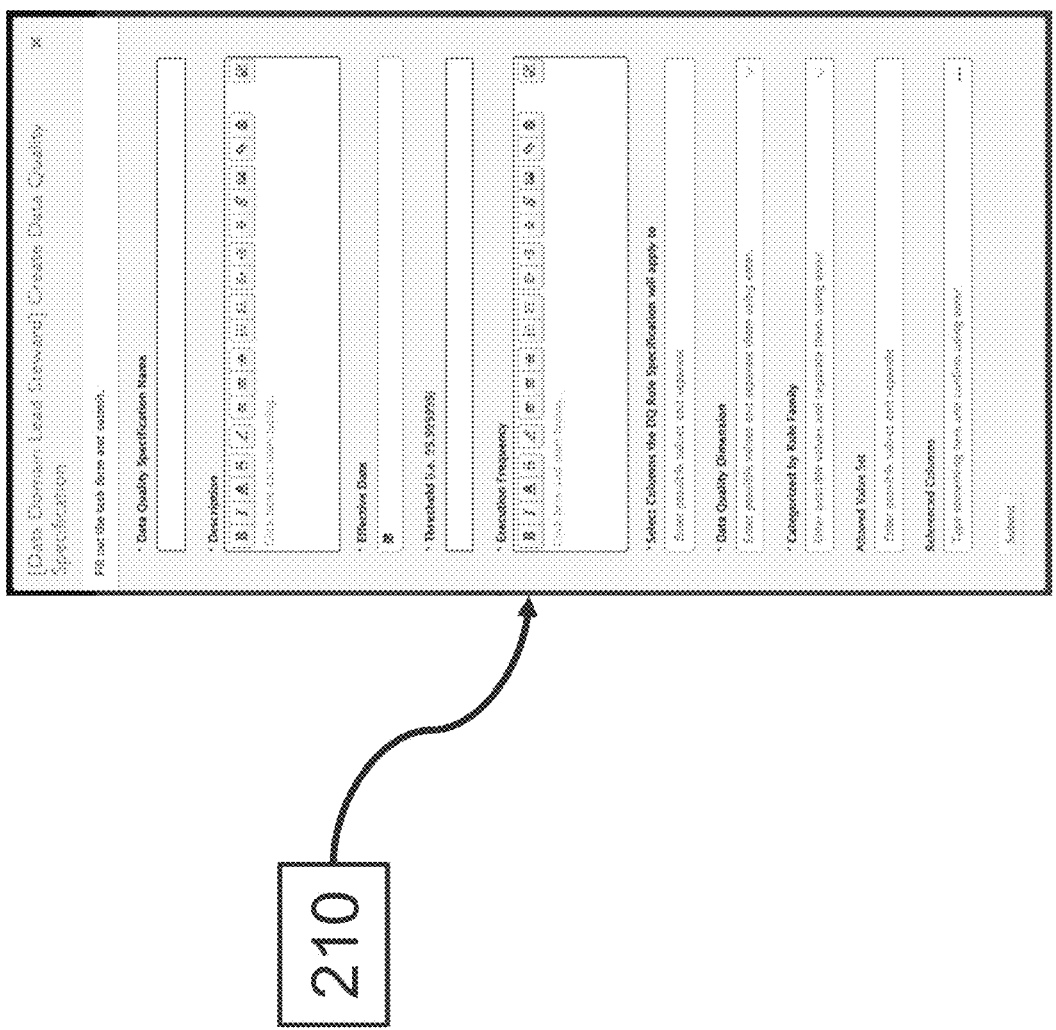

With reference to FIGS. 2A and 2B, exemplary interfaces 200 and 210 are illustrated. Such interfaces may be accessed by user device 105 employing a web browser. Interface 200 may be used by a business stakeholder/end user to create, review and approve a proposed business rule in first system 110 (using, e.g. a business rule creation module) by way of a workflow. The proposed business rule may include the name of the business rule, and English description of the rule, the associated business term, the data quality specification that implements the rules, and the policy implemented by the business rule. By way of example:

Business Rule: Original FICO Score
English Description of the Rule: The FICO Equivalent at Acquisition must be 0 or between 300 and 850.
Business Term: Original FICO Score
Data Quality Rule Specification:
https://businessentity.firstsystem.com/term/
   DQRuleSpecificationExample (a link to the content of the data quality rule specification)
Policy Implemented by the Business Rule:
Ensuring FICO score is within acceptable limits Interface 210 may be used by a data steward/technical stakeholder to create the data quality and profiling rule specification, corresponding to the business rule, in second system 120 (using, e.g., a data quality specification module). The data quality and profiling rule specification may include the data quality specification name; an English description of the rule itself; an effective date of the rule; a threshold; an execution frequency; the columns in the table that the data quality rule specification will apply to; the data quality dimension; the categorization by rule family; the allowed value set; and the referenced columns.

By way of example:
Data Quality Specification Name: Original FICO Score
Data Quality Rule Description: FICO Equivalent at Acquisition must be 0 or a number greater than 300 and less than or equal to 850
Effective Date of the Rule: Jun. 2, 2017
Threshold: 97
Execution Frequency: Monthly
Columns in the table that the data quality rule specification will apply to: SCHEMA.TABLE.TABLECOLUMN (identifying a column in a specified database)

Data Quality Dimension: Completeness
Categorization by Rule Family: Functional
Allowed Value Set: Must be a number between 0 and 1000
Referenced Columns: SCHEMA.TABLE.TABLECOLUMN (identifying a column in a specified database)

The threshold may be, for example, the percentage of records that must pass out of the whole for the rule to be considered as passing, regardless of the number of exceptions to the rule. Other thresholds or scoring mechanisms may be used within the scope of the present invention.

Data quality dimensions may include completeness (the proportion of stored data against the potential of 100% complete); consistency (data sets match across data stores); uniqueness (a data record will be recorded once based upon how that record is identified); validity (data sets conform to the rules and syntax of its definition); accuracy (the degree to which data captured correctly describes the real world object or event being described); and timeliness (the degree to which data represents reality from the required point in time).

The categorization by rule family describes the type of check that is being performed (e.g., functional, null check, range/valid values, service level agreement, standard, reconciliation).

The allowed value set is maintained in the first system 110 and passed to the second system 120 so that the second system 120 can use the allowed values in connection with the testing performed by it. This avoids needing to maintain allowed value sets in multiple platforms. Instead, in accordance with aspects of the present invention, all the information needed by the second system 120 to perform the test is passed to it by way of an integrated workflow.

The reference columns are indications of database columns containing data that will be needed as a reference in connection with performing the data quality test (e.g. FICO Score can be zero if the value of a SCHEMA.TABLE.TABLECOLUMN such as ACTIVE FLAG is "Y") Second system 120 validates the data quality rules specification and a data quality analyst may then write the appropriate data quality rule in second system 120 based on the specification. System 120 then executes the data quality rules (e.g., using validation module) and results/metrics of the data quality rule execution is fed back into first system 110 (e.g., using result publication module). Thus, once the test is run, the results are published to the record associated with the data quality rule and can be accessed via a link to the results.

Link to Results:
https://businessentity.systemone.com/term/DQRuleResults
Exemplary Results:
3,606,376 rows passed, 133 rows failed
Passing fraction=99.99631 . . . Threshold 97
Result "Pass"

In some embodiments of the present invention, the first system 110 can obtain access to data lineage (e.g., processing history/audit trail) for a specific schema.table.tablecolumn. This streamlines the process of generating and documenting/accessing the flow of data.

In some embodiments, the process of creating a business rule, a corresponding data quality specification, implementation of the specification, testing of data in accordance with the specification, and delivering results of the testing, is managed in accordance with an automated workflow. Thus, for example, upon completion of a business rule by a business stakeholder, a notification is sent to a technical stakeholder that a business rule has been completed and a corresponding data quality specification must be created. Tasks associated with the same may be maintained in a queue, and completed according to priority. Notifications of tasks to be completed may be sent, e.g., via electronic mail or indicated by way of a web application interface.

Figure 3:
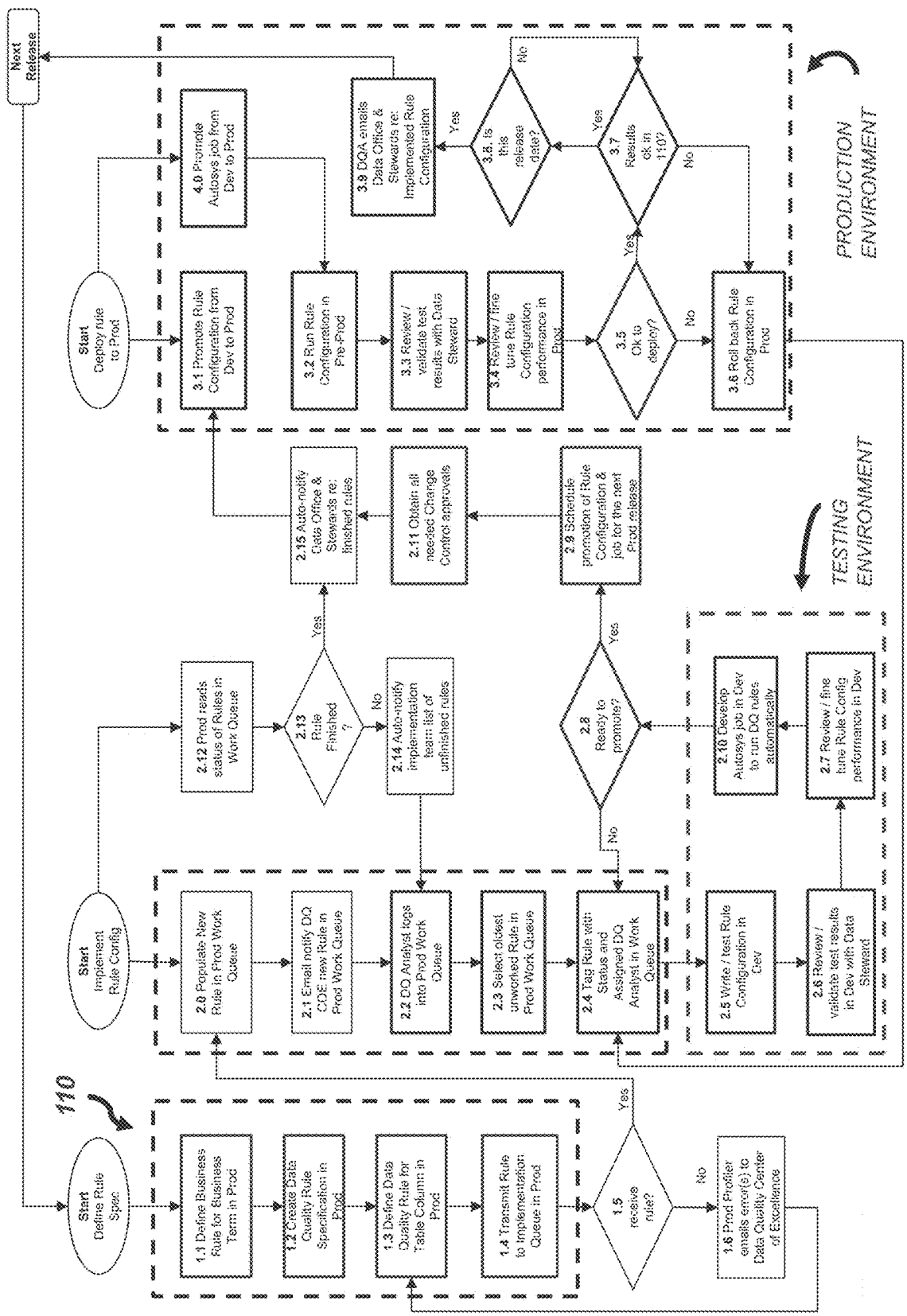
FIG. 3 is a flow diagram illustrating an exemplary process of the present invention.

With reference to FIG. 3, a flow diagram illustrating a method of the present invention is shown. In step 300, the process for defining a rule specification is commenced. Steps 1.1 through 1.4 are performed in, e.g., the first system 110 of FIG. 1, in a preferred embodiment. In step 1.1, the business rule for a business term is defined (using, e.g., interface 200 of FIG. 2A). In step 1.2, a data quality rule specification is created, corresponding to the business rule (using, e.g., interface 210 of FIG. 2B). In step 1.3, the data quality rule for the table column is defined. In step 1.4, the rule is transmitted for implementation in, e.g., central server 125 of FIG. 1. In step 1.5, it is determined if central server 125 has received the rule. If not, in step 1.6, an error notification is sent and the process is repeated from step 1.3. If central server 125 has received the rule, the process for implementing the rule configuration is commenced, in central server 125.

In step 2.0, the new rule is populated in the work queue of the central server 125. In step 2.1, an end user is notified of the new rule and that it is in the production work queue. In step 2.2, a data quality control analyst logs into the production work queue of central server 125. In step 2.3, the oldest or prioritized unworked rule is selected from the work queue. In step 2.4, the rule is tagged with the status and assigned to a data quality analysis. In step 2.5, the code for the rule configuration is written and tested. In step 2.6, the test results are reviewed and validated by the data steward. In step 2.7, the rule configuration performance is reviewed and fine-tuned. In step 2.10, code is written such that the data quality rules will run automatically. In step 2.8, it is determined if the data quality rule is ready for production. If not, the process repeats from step 2.4. If so, in step 2.9 the rule configuration and automatic running is scheduled for the next product release. In step 2.11, all needed change control approvals are obtained. In step 2.15, a notification is sent to data stewards and other interested persons that the rule is completed. Referring back now to step 2.12, in a parallel process, the central server 125 reads that status of the rules in the work queue and assesses whether the rule is finished, in step 2.13. If so, the process returns to step 2.15. If not, in step 2.14, an automatic notification is sent to the interested individuals, indicating the unfinished rules.

At this point, the rule is ready to be deployed in the production environment. In step 3.1, the rule is promoted to the production environment, including the automatic running of the rule, in step 4.0. In step 3.2, the rule configuration is run in production mode. In step 3.3, the test results are reviewed and validated with the data steward. In step 3.4, the rule configuration performance is reviewed and fine-tuned. In step 3.5, it is determined whether the rules are acceptable to deploy. If not, in step 3.6, the rule configuration is rolled back and the process begins again with step 2.4. If so, in step 3.7, the results are viewed in the first system 110, in step 3.7. If the results are not acceptable, the process moves to step 3.6 with a roll back to rule configuration. If the results are acceptable, the process moves to step 3.8 where it is determined whether the rule is scheduled to be released. If not, the process returns to step 3.7. If so, the process moves to step 3.9 where data stewards and other interested parties are notified that the rule configuration is implemented. From there, testing is performed by the second system 120 and the results of the testing made available.

Figure 4:
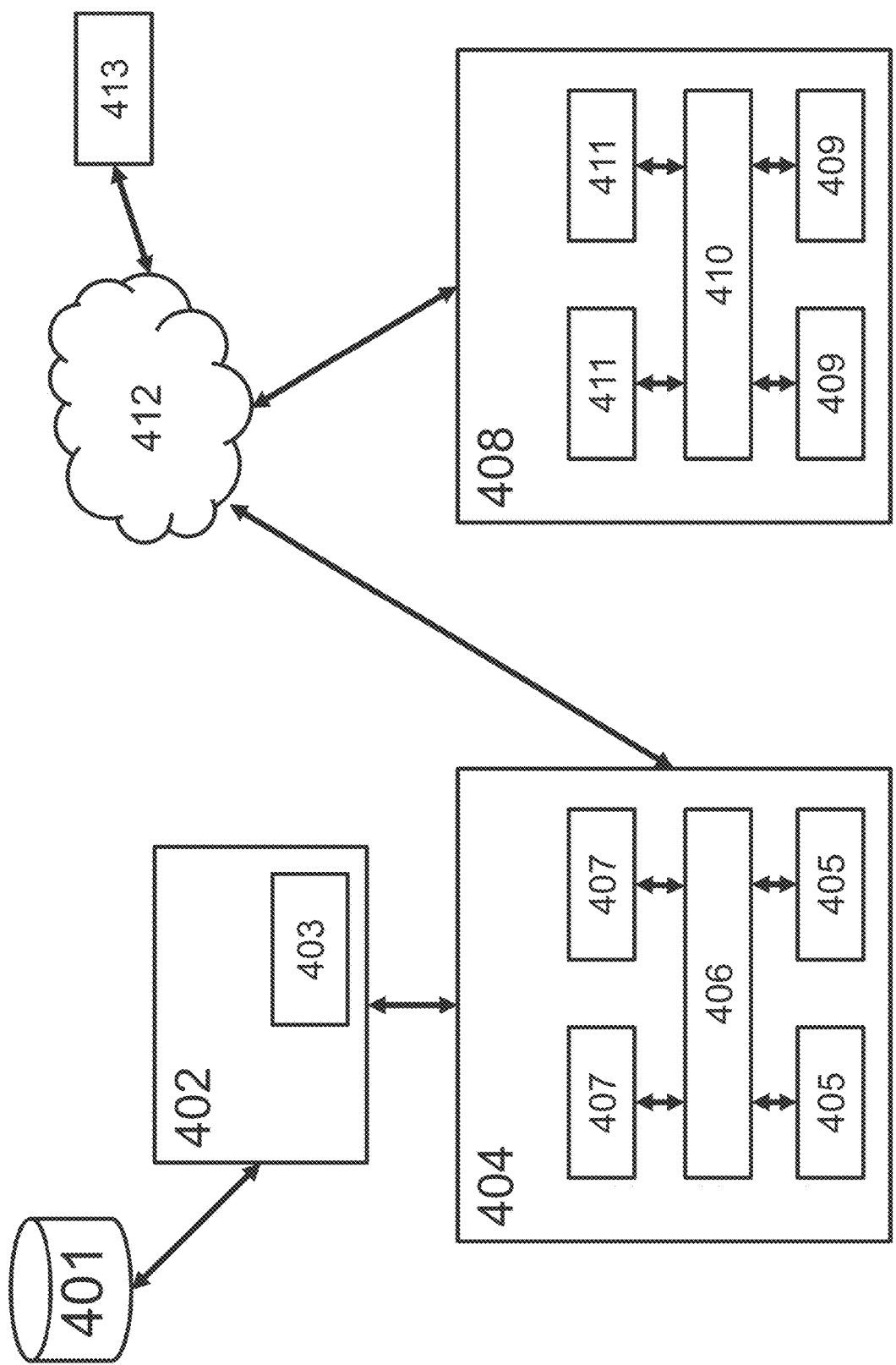
FIG. 4 is an exemplary system for carrying out embodiments of the present invention.

Use of the data quality specification, described herein, as a metadata driven workflow represents an improvement to technology because it imposes automated controls over the data quality review process, thereby eliminating errors and inconsistencies. Through use of the inventive process, a complete record is ensured which documents traceability between a rule, the specification, the technical elements, the requirements, and the business context in a manner that imposes automated controls. In some embodiments, the methods are carried out by a system that employs a client/server architecture such as, for example, the exemplary embodiments described as follows with reference to FIG. 4. The data that may be used as an input to the system and the outputs from the system(s) may be stored in one or more databases 401. Database server(s) 402 may include a database services management application 403 that manages storage and retrieval of data from the database(s) 401. The databases 401 may be relational databases; however, other data organizational structures may be used without departing from the scope of the present invention. Thus, for example, database 401 may be representative of database 115 of FIG. 1.

One or more application server(s) 404 are in communication with the database server 402. The application server 404 communicates requests for data to the database server 402. The database server 402 retrieves the requested data. The application server 404 may also send data to the database server 402 for storage in the database(s) 401. The application server 404 comprises one or more processors 405, non-transitory computer readable storage media 407 that store programs (computer readable instructions) for execution by the processor(s), and an interface 406 between the processor(s) 405 and computer readable storage media 407. The application server 404 may store the computer programs and code used to implement the methods of the present invention. Thus, for example, first system 110 and second system 120 could take the form of application server 404 and would store the software necessary to implement creating of the business rule, data quality specification, and running of the data quality testing.

To the extent data and information is communicated over a network (e.g., the Internet or an Intranet), one or more network servers 408 may be employed. The network server 408 also comprises one or more processors 409, computer readable storage media 411 that store programs (computer readable instructions) for execution by the processor(s), and an interface 410 between the processor(s) 409 and computer readable storage media 411. The network server 408 is employed to deliver content that can be accessed through the communications network 412, e.g., by an end user employing computing device 413 (e.g., device 105 of FIG. 1). When data is requested through an application, such as an Internet browser, the network server 408 receives and processes the request. The network server 408 sends the data or application requested along with user interface instructions for displaying an interface on device 413, such as a point of sale terminal.

The computers referenced herein are specially programmed to perform the functionality described herein.

The non-transitory computer readable storage media (e.g., 407 or 411) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer-implemented method, comprising:
    generating a business rule;
    generating a data quality specification for data to be tested, wherein the data quality specification is generated using the business rule and stored metadata, and wherein the data quality specification includes a test to perform on a set of specified reference data;
    generating a data quality rule corresponding to the data quality specification, wherein the data quality rule is specific to the test, and wherein the data quality rule is used to determine whether data in the production environment conforms to the data quality specification;
    transmitting the data quality rule, wherein when the data quality rule is received at a validation module, the validation module repeatedly executes a process for validating the data quality rule on the set of specified reference data, wherein the specified reference data is specific data used for the test, and wherein the data quality rule is continually updated until a determination is made to promote the data quality rule;
    receiving results of the process to validate the data quality rule, wherein the results include the updated data quality rule;

promoting the updated data quality rule to a production environment;
automating the updated data quality rule to automatically process data in a production environment; and
implementing the updated data quality rule on data in the production environment to determine whether the data in the production environment conforms to the data quality specification.

2. The method of claim 1, further comprising:
automatically transmitting a notification indicating the generation of the business rule.

3. The method of claim 1, wherein the business rule is generated using an automated workflow.

4. The method of claim 1, wherein the business rule includes a policy implemented by the business rule.

5. The method of claim 1, wherein the data quality specification includes a threshold corresponding to a percentage of records needed for the data quality rule to pass.

6. The method of claim 5, wherein the percentage of records includes a number of allowed exceptions to the data quality rule.

7. The method of claim 1, wherein the data quality specification includes an allowed value set that is maintained in a single platform.

8. The method of claim 1, wherein the data quality specification includes an audit trail which includes a processing history of the set of reference data and wherein the data quality specification includes stored metadata indicating specific to the data location information of the set of reference data.

9. The method of claim 1, wherein the validation module repeatedly executes a new process for validating the data quality rule on a new set of specified reference data in a pre-production environment and wherein the data quality rule is continually updated until a new determination is made to promote the data quality rule.

10. A system, comprising:
one or more processors; and
a non-transitory computer-readable medium including instructions that, when executed by the one or more processors, cause the one or more processors to perform operations, including:
generating a business rule;
generating a data quality specification for data to be tested, wherein the data quality specification is generated using the business rule and stored metadata, and wherein the data quality specification includes a test to perform on a set of specified reference data;
generating a data quality rule corresponding to the data quality specification, wherein the data quality rule is specific to the test, and wherein the data quality rule is used to determine whether data in the production environment conforms to the data quality specification;
transmitting the data quality rule, wherein when the data quality rule is received at a validation module, the validation module repeatedly executes a process for validating the data quality rule on the set of specified reference data, wherein the specified reference data is specific data used for the test, and wherein the data quality rule is continually updated until a determination is made to promote the data quality rule;
receiving results of the process to validate the data quality rule, wherein the results include the updated data quality rule;
promoting the updated data quality rule to a production environment;
automating the updated data quality rule to automatically process data in a production environment; and
implementing the updated data quality rule on data in the production environment to determine whether the data in the production environment conforms to the data quality specification.

11. The system of claim 10, further comprising:
automatically transmitting a notification indicating the generation of the business rule.

12. The system of claim 10, wherein the business rule is generated using an automated workflow.

13. The system of claim 10, wherein the business rule includes a policy implemented by the business rule.

14. The system of claim 10, wherein the data quality specification includes a threshold corresponding to a percentage of records needed for the data quality rule to pass.

15. The system of claim 14, wherein the percentage of records includes a number of allowed exceptions to the data quality rule.

16. The system of claim 10, wherein the data quality specification includes an allowed value set that is maintained in a single platform.

17. The system of claim 10, wherein the data quality specification includes an audit trail which includes a processing history of the set of reference data and wherein the data quality specification includes stored metadata indicating data location information of the set of reference data.

18. The system of claim 10, wherein the validation module repeatedly executes a new process for validating the data quality rule on a new set of specified reference data in a pre-production environment and wherein the data quality rule is continually updated until a new determination is made to promote the data quality rule.

19. A computer-program product tangibly embodied in a non-transitory machine-readable storage medium, including instructions that, when executed by one or more processors, cause the one or more processors to:
generate a business rule;
generate a data quality specification for data to be tested, wherein the data quality specification is generated using the business rule and stored metadata, and wherein the data quality specification includes a test to perform on a set of specified reference data;
generate a data quality rule corresponding to the data quality specification, wherein the data quality rule is specific to the test, and wherein the data quality rule is used to determine whether data in the production environment conforms to the data quality specification;
transmit the data quality rule, wherein when the data quality rule is received at a validation module, the validation module repeatedly executes a process for validating the data quality rule on the set of specified reference data, wherein the specified reference data is specific data used for the test, and wherein the data quality rule is continually updated until a determination is made to promote the data quality rule;
receive results of the process to validate the data quality rule, wherein the results include the updated data quality rule;
promote the updated data quality rule to a production environment;
automate the updated data quality rule to automatically process data in a production environment; and
implement the updated data quality rule on data in the production environment to determine whether the data in the production environment conforms to the data quality specification.

20. The computer-program product of claim 19, further comprising instructions to cause the one or more processors to:
   automatically transmit a notification indicating the generation of the business rule.

21. The computer-program product of claim 19, wherein the business rule is generated using an automated workflow.

22. The computer-program product of claim 19, wherein the business rule includes a policy implemented by the business rule.

23. The computer-program product of claim 19, wherein the data quality specification includes a threshold corresponding to a percentage of records needed for the data quality rule to pass.

24. The computer-program product of claim 23, wherein the percentage of records includes a number of allowed exceptions to the data quality rule.

25. The computer-program product of claim 19, wherein the data quality specification includes an allowed value set that is maintained in a single platform.

26. The computer-program product of claim 19, wherein the data quality specification includes an audit trail which includes a processing history of the set of reference data and wherein the data quality specification includes stored metadata indicating data location information of the set of reference data.

27. The computer-program product of claim 19, wherein the validation module repeatedly executes a new process for validating the data quality rule on a new set of specified reference data in a pre-production environment and wherein the data quality rule is continually updated until a new determination is made to promote the data quality rule.

\* \* \* \* \*